(12) United States Patent
Kerska et al.

(10) Patent No.: US 10,955,166 B2
(45) Date of Patent: Mar. 23, 2021

(54) METHOD AND APPARATUS FOR MANIPULATING METAL WORKPIECES

(71) Applicant: Mestek Machinery, Inc., Westfield, MA (US)

(72) Inventors: Steven J. Kerska, Cedar Rapids, IA (US); John R. Welty, Marion, IA (US); Timothy A. Coon, Lisbon, IA (US)

(73) Assignee: Mestek Machinery, Inc., Westfield, MA (US)

( * ) Notice: Subject to any disclaimer, the term of this patent is extended or adjusted under 35 U.S.C. 154(b) by 349 days.

(21) Appl. No.: 15/817,428

(22) Filed: Nov. 20, 2017

(65) Prior Publication Data

US 2018/0142916 A1 May 24, 2018

Related U.S. Application Data

(60) Provisional application No. 62/425,297, filed on Nov. 22, 2016.

(51) Int. Cl.
*B23K 10/00* (2006.01)
*F24F 13/02* (2006.01)
*B21D 51/06* (2006.01)

(52) U.S. Cl.
CPC .......... *F24F 13/0245* (2013.01); *B21D 51/06* (2013.01); *B23K 10/00* (2013.01)

(58) Field of Classification Search
CPC ..... F24F 13/0245; B21D 51/05; B23K 10/00; B23K 10/006; H05B 1/26; H05H 1/36; H05H 1/34
USPC ............ 219/121.39, 121.44, 121.45, 121.56, 219/121.58, 121.54
See application file for complete search history.

(56) References Cited

U.S. PATENT DOCUMENTS

| | | | | |
|---|---|---|---|---|
| 5,036,176 A | * | 7/1991 | Yamaguchi | B23K 9/06 219/121.44 |
| 6,414,264 B1 | * | 7/2002 | von Falkenhausen | A61K 9/7023 219/121.72 |
| 7,582,847 B2 | * | 9/2009 | Scott | B23P 15/406 219/121.39 |
| 2004/0143954 A1 | | 7/2004 | Walsh | |
| 2005/0001872 A1 | * | 1/2005 | Ahne | B26D 5/00 347/19 |

(Continued)

FOREIGN PATENT DOCUMENTS

EP          0257766 A2    3/1988

OTHER PUBLICATIONS

European Search Report dated Apr. 19, 2018.

(Continued)

*Primary Examiner* — Mark H Paschall
(74) *Attorney, Agent, or Firm* — Grogan, Tuccillo & Vanderleeden LLP

(57) ABSTRACT

A method of forming a duct section from a web of material includes the steps of forming a series of perforations in a web of material, the series of perforations defining an outline of one of a hole or notch in a finished duct section, forming a male lock bend and a female lock seam in first opposed edges of the web of material, forming flanges in second opposed edges of the web of material, removing the portion of material interior to the series of perforations to form the hole or notch, and bending the web of material to form the finished duct section.

9 Claims, 4 Drawing Sheets

(56) References Cited

U.S. PATENT DOCUMENTS

| | | | |
|---|---|---|---|
| 2009/0032503 A1* | 2/2009 | Danzer | B23K 7/002 219/121.44 |
| 2009/0064832 A1* | 3/2009 | Caretta | B23K 26/0093 83/76.7 |
| 2014/0209574 A1 | 7/2014 | Walsh | |
| 2016/0094744 A1 | 3/2016 | Yamamoto | |
| 2016/0297027 A1 | 10/2016 | Walsh | |

OTHER PUBLICATIONS

International Search Report and Written Opinion dated Feb. 1, 2018 issued in the corresponding PCT Patent Application No. PCT/US2017/062470.

* cited by examiner

METHOD AND APPARATUS FOR MANIPULATING METAL WORKPIECES

CROSS-REFERENCE TO RELATED APPLICATIONS

This application claims the benefit of U.S. Provisional Application Ser. No. 62/425,297, filed on Nov. 22, 2016, which is herein incorporated by reference in its entirety.

FIELD OF THE INVENTION

The present invention relates generally to manipulating metal workpieces and, more particularly, to a method and apparatus for forming features in a sheet of material for subsequent bending into an HVAC duct section.

BACKGROUND OF THE INVENTION

A plasma cutter is a cutting tool used in manufacturing industries for cutting electrically conductive materials such as steel, aluminum, brass and copper. Plasma cutters work by creating an electrical channel of superheated, electrically ionized gas ("plasma") from the plasma cutter, through the material to be cut, thus forming a completed circuit back to the plasma cutter via a grounding clamp. This is accomplished by forcing a compressed gas (e.g., oxygen, nitrogen, argon shop air, etc.) through a focused nozzle at high speed toward the workpiece/material to be cut. An electrical arc is then formed within the gas, between an electrode near or integrated into the gas nozzle and the work piece itself. The electrical arc ionizes some of the gas, thereby creating an electrically conductive channel of plasma. As electricity from the torch travels down this plasma, it delivers sufficient heat to melt through the workpiece. At the same time, much of the high velocity plasma and compressed gas blow the hot molten metal away, thereby separating i.e. cutting through the work piece. In recent years, plasma cutters have been integrated with computer numeric control systems, providing greater flexibility for the plasma cutter to cut diverse shapes in workpiece, based on the instructions programmed into the machine's numerical control.

In HVAC industry, box-shaped ducts are extensively used in heating and ventilating systems to distribute heated or cooled air throughout a structure. The ducts are commonly formed in sections of predetermined length, which are then connected end-to-end to form a continuous air distribution duct. The material from which the duct sections are formed is typically sheet of material of a desired gauge fed from a roll or coil of material. Recently, plasma cutters have been employed in the duct fabrication process, such as to cut the sheet material into shapes and configurations necessary for forming the duct sections, and to form notches, taps, access doors and the like in such duct sections. Typically, these cuts are made in the sheet material prior to bending into a completed duct section. As will be readily appreciated, forming structures such as notches, taps, and access doors in the sheet material requires flexible moving of the plasma cutter over the sheet material.

While the use of plasma cutters has proven advantageous to the duct fabrication process, certain drawbacks do exist. For example, removing quantities of material from the sheet material to form notches, taps, access doors and like features prior to bending into a completed duct section can greatly reduce the integrity of the sheet material, rendering it less structurally sound and making the subsequent rolling and bending processes much more difficult.

In view of the above, there is a need for an improved method and apparatus for fabricating HVAC duct sections using a plasma cutter

SUMMARY OF THE INVENTION

It is an object of the present invention to provide a method and apparatus for manipulating a metal workpiece.

It is an object of the present invention to provide a method and apparatus for fabricating HVAC duct sections.

It is an object of the present invention to provide a method and apparatus for forming notches, taps, access doors and related features in HVAC duct sections.

It is an object of the present invention to provide a method and apparatus for forming notches, taps, access doors and related features in HVAC duct sections, which does not compromise the integrity of the sheet material prior to bending.

It is an object of the present invention to provide a method and apparatus for fabricating HVAC duct sections more quickly and efficiently, and at a lower cost, as compared to existing methods and devices.

These and other objects are achieved by the present invention.

According to an embodiment of the present invention, a method of manipulating a sheet of material includes loading cutting parameter data into a controller, the cutting parameter data defining an architecture of at least one feature to be formed in a sheet of material, and forming a series of perforations in the sheet of material in accordance with the cutting parameter data, the series of perforations forming an outline of the at least one feature.

According to another embodiment of the preset invention an apparatus for manipulating a sheet of material includes a cutting table for supporting a sheet of material, a cutting device positioned adjacent to the cutting table, and a controller operatively connected to the cutting device and configured to control a position of the cutting device with respect to the cutting table. The controller is further configured to control the cutting device to form a series of perforations in the sheet of material, wherein the series of perforations define an architecture of at least one feature to be formed in the sheet of material.

According to yet another embodiment of the present invention, a method of forming a duct section from a web of material includes the steps of forming a series of perforations in a web of material, the series of perforations defining an outline of one of a hole or notch in a finished duct section, forming a male lock bend and a female lock seam in first opposed edges of the web of material, forming flanges in second opposed edges of the web of material, removing the portion of material interior to the series of perforations to form the hole or notch, and bending the web of material to form the finished duct section.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
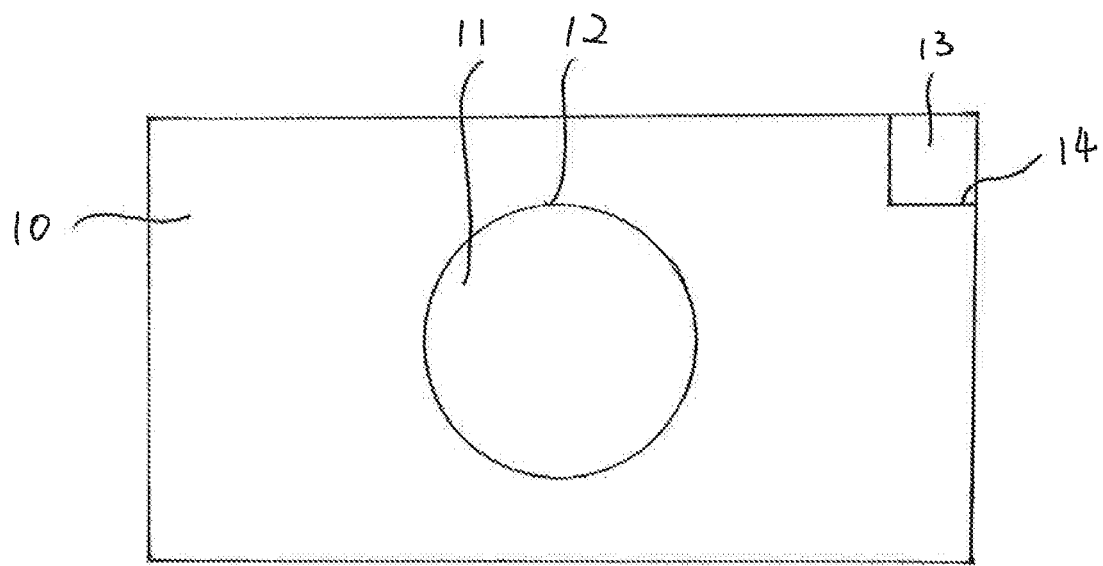
FIG. 1 is a top plan view of a sheet of material having features produced using a plasma cutter of the prior art.

FIG. 1 illustrates a sheet of material processed by a plasma cutter of the prior art. The sheet of material 10 may take the form of any type of electrically conductive material known in the HVAC industry for manufacturing a ventilation duct such as, for example, steel, aluminum, brass, copper, etc. As is known in the art, when a plasma cutter (not shown) is applied to the sheet of material 10, an electrical channel of superheated, electrically ionized gas is continuously blown through a focused nozzle at high speed toward the surface of the sheet of material 10, melting through the sheet of material 10 by delivering sufficient heat toward its surface, while the head of the plasma cutter moves above the sheet of material. A plasma cutter can therefore be used to create various features in a sheet of material such as sheet metal. As illustrated in FIG. 1, for example, a continuous hole seam 12 can be created by the plasma cutter to form a hole 11 in the material, and/or a continuous notch seam 14 can be cut on the corner of the sheet of material 10 by the plasma cutter to create a notch 13. Therefore, by controlling the moving pathway of the plasma cutter, various types of structures and features can be created on the sheet of material 10 including, but not limited to, holes, notches, taps, access doors, etc. With existing methods and apparatuses, however, all the cutting seams created by the plasma cutter are continuous, and hence the cut off portion of the sheet of material 10, such as the portion of material within the hole 11 or notch 13, are removed completely upon conclusion of the plasma cutting process.

Figure 2:
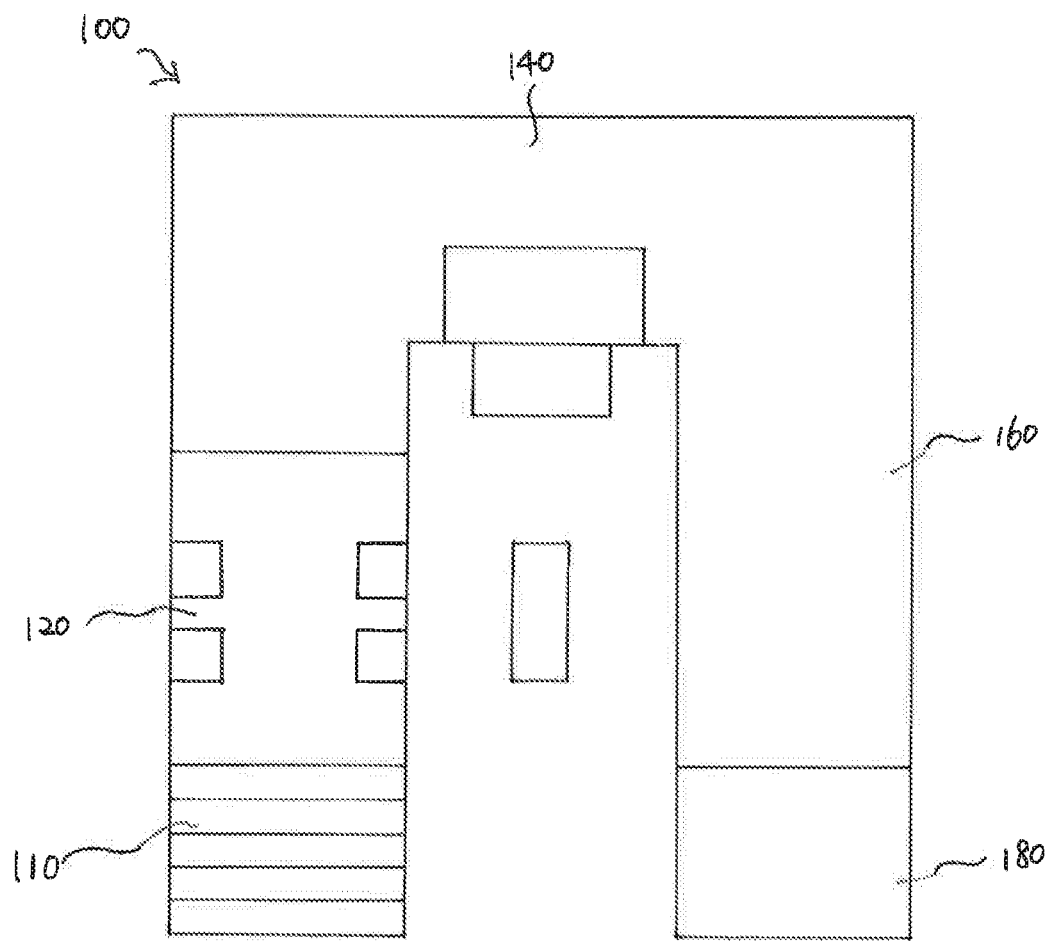
FIG. 2 is a schematic plan view of a production line on which a workpiece is manipulated and formed into ventilation duct.

Turning now to FIG. 2, a system 100, in the form of a production line for forming metal HVAC ducts from a thin sheet of material according to an embodiment of the present invention is illustrated. As shown therein, the system 100 includes at least, a start end 110, a first station 120, a second station 140, a third station 160, and a finish end 180. At the start end 110, a sheet of material, preferably sheet metal, of a desired gauge and width is supplied in large rolls or coils. As is well known to those skilled in the art, the sheet of material from one of the coils is fed by a feeder (not shown) into the first station 120.

In an embodiment, the first station 120 may include a coil straightener, a plasma cutting table, a shearing section, and a plasma cutter, which each may take one of various forms known in the art. The coil straightener contains a plurality of rolls that will remove the set in the material caused by it being wound on a coil. The coil straightener thus straightens the sheet of material and feeds the sheet of material to the plasma cutting table where the sheet is cut to size and various features are cut in the material, as discussed below.

Figure 3:
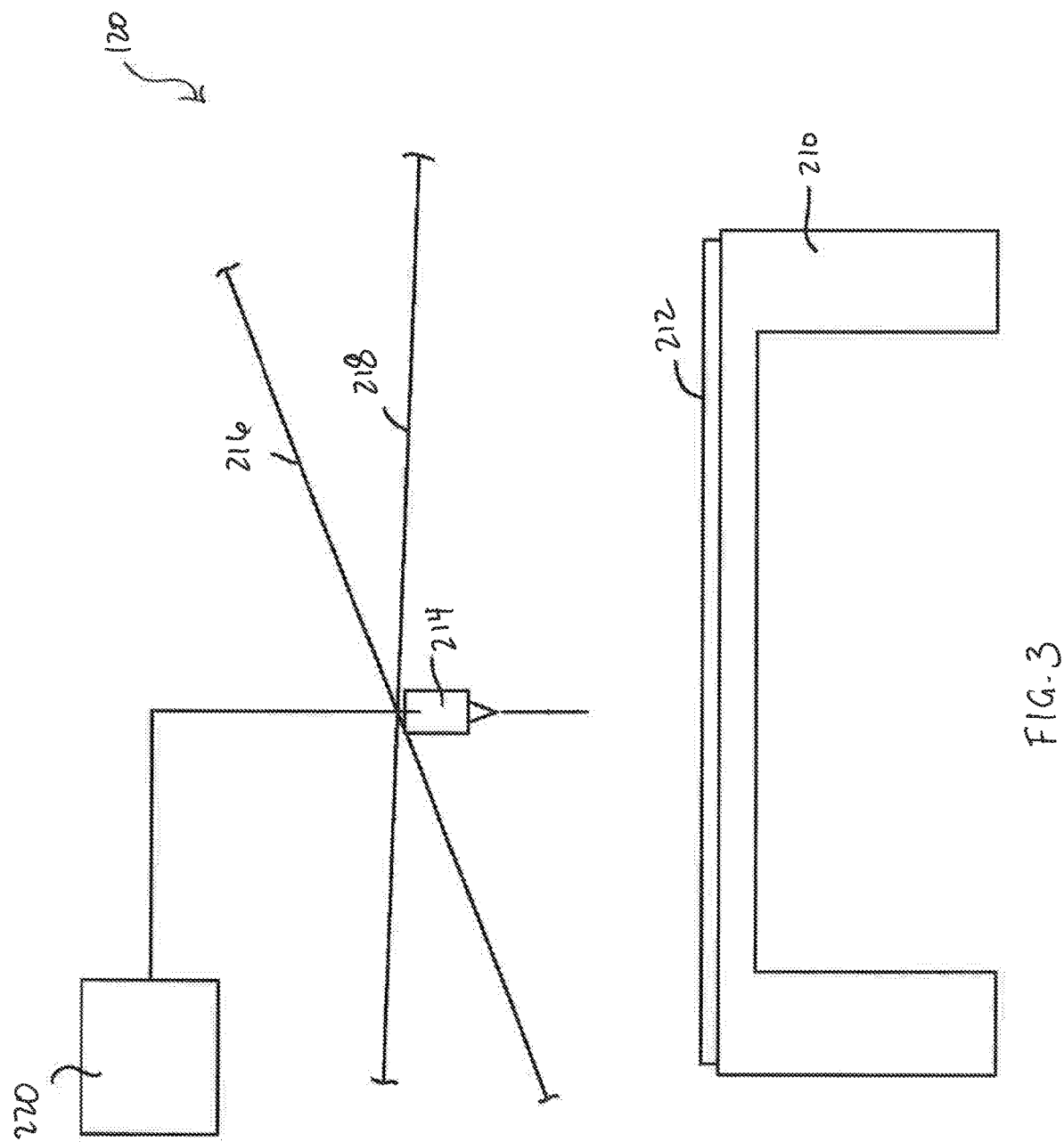
FIG. 3 is a simplified schematic illustration of a plasma cutting station of the production line of FIG. 2.

As best shown in FIG. 3, the plasma cutting section of the first station 120 includes a plasma cutting table 210 supporting a sheet of material 212 after it has been unwound from the rolls and straightened with the coil straightener. The plasma cutting section also includes a plasma cutter 214 suspended above, and spaced from, the plasma cutting table 210. As shown therein, the plasma cutter 214 is preferably mounted on a track for movement along a pair of axes 216, 218 such that plasma cutter 214 is capable of being positioned over any point above the table 210 and sheet of material 212. The plasma cutter may generally take the form of any plasma cutting device known in the art, and is electrically connected to a power source (not shown) and a controller 220 (or otherwise in communication with the controller 220). As discussed in detail hereinafter, the controller 220 is configured to control the movement of the plasma cutter 220 along the axes 216, 218. In addition, in certain embodiments, the controller 220 may also be configured to control the height of the plasma cutter 214 with respect to the sheet of material 212. Importantly, the controller 220 is configured to control operation of the plasma cutter 214, and the position thereof with respect to the sheet of material 212, according to a schematic diagram and/or cutting diagram for the sheet of material 212 stored in memory, as discussed hereinafter.

In the preferred embodiment, the controller 220 and/or plasma cutter 214 is capable of downloading a blueprint or other technical drawings, diagrams or cutting positional data (also referred to as cutting parameter data that defines an architecture of features to be formed in a finished duct section) for cutting the sheet of material from most CAD MEP/Revit software packages. In an embodiment, the controller 220 has input/output capabilities so that user can also design and input the blueprints or technical drawings for plasma cutting into the controller 220, allowing for custom cutting of features and other structures on the sheet of material 212. The blueprints/cutting data can be either pre-entered from the controller prior to the plasma cutting process, or entered simultaneously while the plasma cutting is conducted on the sheet of material. The moving pathway of the plasma cutter during the plasma cutting process is determined by the cutting data it receives from the controller 220.

In an embodiment, during the plasma cutting process, the plasma cutter 214 selectively moves, under control of the controller 220, in at least two directions. In particular, the plasma cutter 214 is capable of moving along one X axis (e.g., axis 216) and one Y axis (e.g., axis 218). In an embodiment, The X axis neither overlaps nor is parallel to the Y axis. In an embodiment, the X axis is orthogonal to the Y axis. In another embodiment, the angle formed by the X axis and Y axis can be any degree between zero to one hundred and eighty degrees. Being capable of moving along unparalleled X axis and Y axis, the moving range of the plasma cutter 214 covers the entire area of the plasma cutting table 210. Therefore, the plasma cutter can be positioned automatically to reach to any single point on the sheet of material 212 for cutting any desired structures, without manually adjusting the position of the sheet of material 212.

The controller 220 is operable to control the plasma cutter 214 to make continuous cuts in the sheet of material 212, so as to completely remove a portion of material from the sheet to form hole 21 and notch 23, as shown in FIG. 1, as well as other shapes and structures. Importantly, however, the controller 220 and plasma cutter 220 are also operable to create perforated cuts (more generally, perforations) in the sheet of material 212. In this respect, the plasma cutter 214 is operable in both a continuous cutting mode or a perforated cutting mode.

Figure 4:
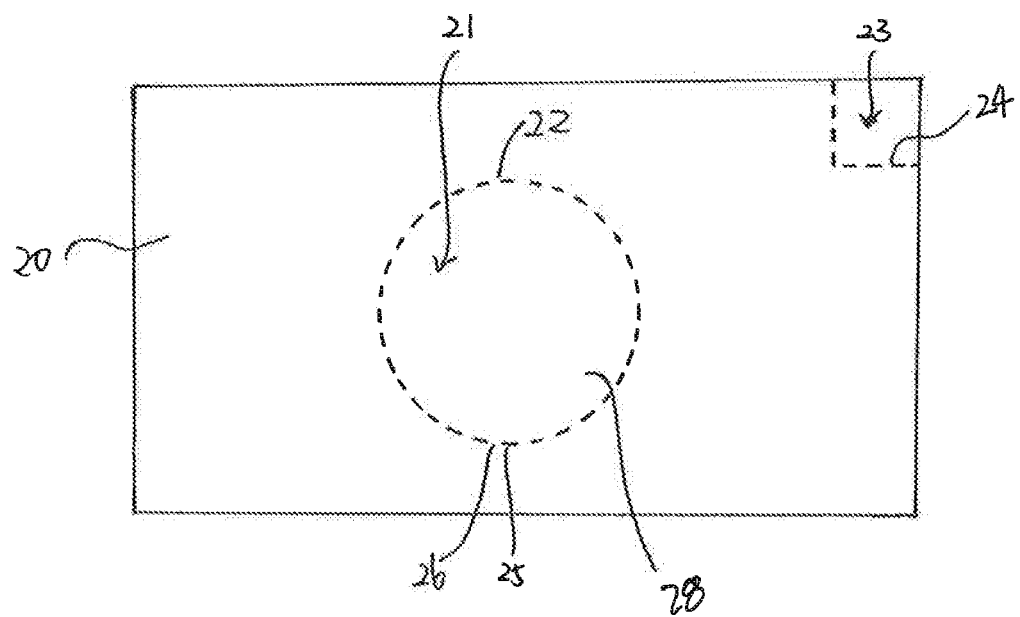
FIG. 4 is a top plan view of a sheet of material having features produced using the method and apparatus of the present invention.

For example, as shown in FIG. 4, during operation, plasma created by the plasma cutter 214 is directed toward the surface of a sheet of material (e.g., sheet of material 20) and melts through the sheet of material 20 to create a cutting seam 22. However, in the perforated cutting mode, instead of a continuous seam such as those formed by known systems and devices, such as continuous hole seam 12 and continuous notch seam 14, the cutting seam 22 created by the plasma cutter of the present invention may be intermittent or perforated. In particular, the perforated seam 22 includes a series of perforations 25, cut by the plasma cutter 214, and small webs 26 of material which are not removed from the sheet 20 (but which remain intact after the plasma cutting process). Hence, the outline of a hole 21 is formed by the perforated seam 22. The web of material 28 (also referred to as a blank or knock-out) interior to the perforated seam 22 remains partially attached to the metal sheet 20 due to the small webs 26 of material connected the blank 28 to the larger sheet of material. A perforated outline for a notch 23 can also be created by the plasma cutter in the same manner, by forming a series of perforations and interposed webs in the shape of the notch 23. Like the hole 21, importantly, the web of material forming undetached notch 23 remains attached to the sheet of material 20 after the plasma cutting process is complete.

Perforated cutting may be carried out by selectively activating and deactivating the plasma cutter 214 as it moves along the pre-programmed pathway. In an embodiment, deactivating the plasma cutter may include, for example, interrupting the supply of power to the plasma cutter or interrupting the supply of gas to the plasma cutter. In other embodiments, perforated cuts may be made by increasing the spacing distance of the plasma cutter 214 from the sheet of material so that the plasma cutter does not cut through the sheet.

Importantly, by preserving the partial attachment between the web of material defining the undetached holes 21 or undetached notch 23 and the metal sheet 20, the structural integrity of the metal sheet 20 is maintained, which has heretofore not been possible with prior art systems and methods. In particular, existing methods of cutting various features such as holes, doors, notches and the like in the sheet of material (where the material is completely removed during the cutting process) can compromise the structural integrity of the sheet, making it difficult to perform downstream manipulations of the sheet. By maintaining the structural integrity of the sheet after the formation of holes, doors, notches and the like, by creating a perforated outline of such features, however, subsequent processing of the material such as by rolling and bending into completed duct sections, can be more easily effected.

Referring once again to FIG. 2, after the plasma cutting of the features in accordance with the stored cutting data is completed, the sheet of material 212 then moves forward, from bottom to top in FIG. 2, into the shearing section of the first station 120. The processed portion of the sheet of material 212 is sheared off from the coil by the plasma cutter 214 (e.g., by making a continuous cut across the sheet). It should also be noted that, in the present invention, cutting of all types of structures and features, including shearing, can be accomplished by one plasma cutter on the plasma cutting table in the first station, thereby saving time and reduce the number of the plasma cutter needed.

After the processed portion of the sheet of material is sheared off at the shearing section of the first station 120, the sheet of material moves forward along an axis of travel and enters into the second station 140. The second station 140 is positioned in line orthogonal to the first axis of travel of the sheet of material. At the second station 140, the pathway traveled by the sheet of material defines a second axis of travel that is orthogonal to the first axis of travel of the sheet of material. The second station 140 includes a male lock seam rolling former and a female lock seam roll former. A pair of male and female lock seams formed by the rolling formers in a manner known in the art. The roll former may generally take the form of any roll former commonly known in the art that is utilized to form various style lock seams. In particular, the roll former may be configured to form any style of lockseam, such as a Pittsburg seam or Snaplock seam. The male and female lock seam are formed on opposite sides of the sheet of material by the rolling former. In one embodiment, the male and female lock seams are formed on the upper and bottom edges of the sheet of material. In another embodiment, the male and female lock seams are formed on the right and left side of the sheet of material.

After formation of the male and female lock seams, the sheet of material forward to the third station 160. As illustrated in FIG. 2, the third station 160 is arranged substantially parallel to the first station 120 and is orthogonal to the second station 140. Within the third station 160, the sheet of material moves along a third axis that is orthogonal to the second axis of travel of sheet of material, and is parallel but in an opposite direction as to the first axis of travel of the sheet of material. At the third station 160, duplex flanges are formed by flange roll formers on a pair of opposite sides of the sheet of material. The flange roll formers may take any form known in the art for forming any type of transverse flange known in the art. It should be noted that the duplex flanges are formed on the sides opposite from the male and female lock seams are In an embodiment, additional plasma cutting can be accomplished in the third station 160, utilizing either the same plasma cutter 214 used at the first station 120, or a separate, additional plasma cutter. Where a single plasma cutter is utilized, the tracks 216, 218 are of a length sufficient to allow movement of the plasma cutter 214 between the first station 120 and the third station 160. In an embodiment, the plasma cutter 214 may be mounted for movement to any position above the system/production line 100, to carry out a variety of cutting operations. For example, at the third station 160, additional features such as notches, holes, taps, access doors and etc. can be cut into the sheet of material, as desired.

After the flanges are completed in the third station 160, the processed sheet of material moves forward and enters into the finished end 180. In the finished end 180, the blanks/knock-outs formed by the perforated cuts, such like the hole portion 21 and notch portion 23 in FIG. 4, which have remained attached to the sheet of material during the rolling forming operations, are removed, either manually or automatically. The processed sheet of material is then transferred to a bending brake (not shown) where three 90 degree bends are made, and the male and female lock seams are assembled to form the box-shaped duct section.

In an embodiment, the apparatus 100 may include a computer or programmable logic controller (not shown) and a plurality of switches, sensors and timers that operate in conjunction with one another and according to a set of instructions stored in memory. The computer or programmable logic controller can be the same controller for controlling the plasma cutter, or can be a separate computer. In particular, all of the operational sequences for forming a completed duct section may be carried out automatically under the control of the computer or programmable logic controller in concert with the switches, sensors and timers.

As discussed above, the method and apparatus of the present invention therefore provide a means to create various holes, notches, access doors, windows, slits and other features in a sheet of material without compromising the structural integrity and rigidity of the material which is necessary to carry out downstream roll forming and bending operations on the sheet. In particular, by creating perforated cuts that define such holes, notches, access doors, windows, slits and other features in the sheet of material while the sheet is flat, large voids in the sheet are not present during subsequent roll forming and bending operations. Indeed, the material interior to the perforated cuts can easily be removed using manual or automatic punching means after such roll forming and/or bending operations. As such, the structural integrity of the sheet of material is maintained until very near the end of the duct fabrication process, providing for a level of precision and ease of assembly heretofore not seen in the prior art.

While the embodiments described above utilize a plasma cutter to make perforated cuts in the sheet of material, it is contemplated that other means may also be employed to make such perforated cuts such as, for example, mechanical cutting, punching or machining devices or lasers (e.g., a fiber laser).

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An apparatus for manipulating a sheet of material, comprising:
   a cutting table for supporting a sheet of material;
   a plasma cutter positioned adjacent to said cutting table; and
   a controller operatively connected to said plasma cutter and configured to control a position of said plasma cutter with respect to said cutting table;
   wherein said controller is configured to control said plasma cutter to form a series of perforations in said sheet of material, said perforations defining openings through said sheet of material and in which adjacent perforations are separated by predetermined distances along a predetermined path; and
   wherein said series of perforations define an architecture of at least one feature to be formed in removed from said sheet of material.

2. The apparatus of claim 1, wherein:
   said architecture defines the periphery of said feature to be removed from said sheet of material.

3. The apparatus of claim 2, wherein:
   said at least one feature is a hole, a notch, a tap or an access door.

4. The apparatus of claim 2, wherein:
   said controller is configured to control said plasma cutter to form a continuous cut in said sheet of material to remove a portion of material from said sheet of material.

5. The apparatus of claim 2, wherein:
   said controller is configured to control said plasma cutter to form a continuous cut in said sheet of material to shear said sheet of material from a web.

6. The apparatus of claim 2, wherein:
   said sheet of material is sheet metal.

7. The apparatus of claim 2, wherein:
   said plasma cutter is operable in a continuous cutting mode and a perforation cutting mode.

8. A forming apparatus for manipulating a metal workpiece, comprising:
   a cutting table for supporting said metal workpiece;
   a plasma cutter positioned adjacent to said cutting table; and
   a controller operatively connected to said plasma cutter and configured to control a position of said plasma cutter with respect to said cutting table;
   wherein said controller is configured to control said plasma cutter to form a series of perforations in said metal workpiece, said perforations defining openings through said sheet of material and being interspersed with remaining portions of said metal workpiece therebetween; and
   wherein said series of perforations define an architecture of at least one feature of said metal workpiece.

9. A cutting apparatus for manipulating a metal workpiece, comprising:
   a cutting table for supporting said metal workpiece;
   a plasma cutter positioned adjacent to said cutting table; and
   a controller operatively connected to said plasma cutter and configured to control a position of said plasma cutter with respect to said cutting table;
   wherein said controller is configured to control said plasma cutter to form a series of perforations in said metal workpiece, said perforations defining openings through said sheet of material that are interspersed with portions of said metal workpiece, defining in total a removal boundary; and
   wherein said removal boundary defines a portion of said metal workpiece that is to be later removed from said metal workpiece.

* * * * *